(12) United States Patent
Deshpande et al.

(10) Patent No.: US 10,296,932 B2
(45) Date of Patent: May 21, 2019

(54) SYSTEM AND METHOD FOR DIFFERENTIATED CUSTOMER SERVICE IN TERMS OF FUFILLMENT EXPERIENCE BASED ON CUSTOMER LOYALTY AND COST TO SERVE

(71) Applicant: International Business Machines Corporation, Armonk, NY (US)

(72) Inventors: Ajay A. Deshpande, White Plains, NY (US); Arun Hampapur, Norwalk, CT (US); Ali Koc, White Plains, NY (US); Yingjie Li, Chappaqua, NY (US); Xuan Liu, Yorktown Heights, NY (US); Brian L. Quanz, Yorktown Heights, NY (US); Dahai Xing, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 555 days.

(21) Appl. No.: 15/153,088

(22) Filed: May 12, 2016

(65) Prior Publication Data
US 2017/0330218 A1   Nov. 16, 2017

(51) Int. Cl.
G06Q 30/02 (2012.01)
G06Q 30/06 (2012.01)

(52) U.S. Cl.
CPC ..... *G06Q 30/0233* (2013.01); *G06Q 30/0635* (2013.01)

(58) Field of Classification Search
CPC ...................................................... G06Q 30/02
See application file for complete search history.

(56) References Cited

U.S. PATENT DOCUMENTS 7,370,005 B1   5/2008   Ham et al.
7,917,387 B2   3/2011   Spurr et al.
(Continued)

OTHER PUBLICATIONS

Acimovic J. A., "Lowering Outbound Shipping Costs in an Online Retail Environment by Making Better Fulfillment and Replenishment Decisions", MIT PhD Thesis, pp. 1-198 (Aug. 2012).
(Continued)

*Primary Examiner* — Vincent M Cao
(74) *Attorney, Agent, or Firm* — Scully, Scott, Murphy & Presser, P.C.; Grant Johnson (57) ABSTRACT

A method is provided for selecting eligible nodes and item assignments to those nodes for fulfillment based on satisfaction of a reward constraint and fulfillment cost. This method includes several steps, including determining by a computer processor of the fulfillment engine whether each of the plurality of assignments to the plurality of nodes satisfies a reward constraint based on a first customer loyalty reward level of the plurality of customer loyalty reward levels, identifying by a computer processor of the fulfillment engine one or more satisfactory assignments to nodes by identifying which of the one or more assignments is both associated with an order fulfillment cost that is less than the maximum fulfillment cost and satisfies the reward constraint and automatically generating by a computer processor of the fulfillment engine a node order assignment assigning the current order to the one or more satisfactory nodes.

20 Claims, 6 Drawing Sheets

(56) References Cited

U.S. PATENT DOCUMENTS

| | | |
|---|---|---|
| 8,015,081 B1 | 9/2011 | Franco |
| 8,204,799 B1 | 6/2012 | Murray et al. |
| 8,249,917 B1 | 8/2012 | Kassmann et al. |
| 8,352,382 B1 | 1/2013 | Katta et al. |
| 8,374,922 B1 | 2/2013 | Antony |
| 8,498,888 B1* | 7/2013 | Raff .................... G06Q 10/087 705/22 |
| 8,626,333 B2 | 1/2014 | Waddington et al. |
| 8,818,836 B1 | 8/2014 | Braumoeller et al. |
| 2001/0037241 A1* | 11/2001 | Puri ..................... G06Q 30/02 705/14.23 |
| 2002/0123926 A1* | 9/2002 | Bushold ............... G06Q 30/02 705/14.19 |
| 2003/0093388 A1 | 5/2003 | Albright |
| 2007/0130089 A1* | 6/2007 | Chiu .................... G06Q 30/02 705/400 |
| 2007/0192215 A1* | 8/2007 | Taylor ................. G06Q 10/087 705/28 |
| 2007/0271150 A1* | 11/2007 | Abbott .................. G06Q 30/02 705/26.81 |
| 2008/0301009 A1* | 12/2008 | Plaster ................. G06Q 10/087 705/28 |
| 2009/0164321 A1* | 6/2009 | Vasilakos .............. G06Q 30/02 705/14.52 |
| 2010/0145786 A1* | 6/2010 | Fordyce, III .......... G06Q 30/02 705/14.27 |
| 2012/0078673 A1 | 3/2012 | Koke et al. |
| 2012/0150583 A1 | 6/2012 | Dueck et al. |
| 2012/0150692 A1 | 6/2012 | Dueck et al. |
| 2015/0052019 A1 | 2/2015 | Field-Darraugh et al. |

OTHER PUBLICATIONS

Kewill Corporation, "Omni-Channel Optimization for Retailers: Fulfillment Best Practice to Deliver on Customer Promises and Drive Down Returns", pp. 1-12 (Jul. 2013).

Mell P., et al., "The NIST Definition of Cloud Computing", NIST Special Publication 800-145, National Institute of Standards and Technology, U.S. Department of Commerce, pp. 1-7 (Sep. 2011).

Xu P.J. et al., "Order Fulfillment in Online Retailing: What Goes Where", MIT Thesis, pp. 1-146 (Sep. 2005).

* cited by examiner

SYSTEM AND METHOD FOR DIFFERENTIATED CUSTOMER SERVICE IN TERMS OF FUFILLMENT EXPERIENCE BASED ON CUSTOMER LOYALTY AND COST TO SERVE

FIELD

The present application relates generally to computers, and computer applications, and more particularly to computer-implemented method to provide customer order fulfillments in a retail supply network.

BACKGROUND

Typically when an individual orders one or more items from an online retailer that online retailer assigns the fulfillment of that order to one or more nodes, which can be a fulfillment center or a retail store that is capable of fulfilling orders from the retail store itself This assignment typically only takes into account availability of the ordered item or items at the node or nodes, or the shipping cost of the ordered item or items from the node or nodes.

The typical assignment cannot take into account various other potential impacts on the fulfillment process, such as a loyalty reward to the specific customer placing the order.

What is desired is a system and method that can determine a trade off between rewarding customer loyalty and total cost to serve that customer when determining item-node fulfillment of a specific online order.

BRIEF SUMMARY

A method is provided for selecting eligible nodes and item assignments to those nodes for fulfillment based on satisfaction of a reward constraint and fulfillment cost.

One embodiment of this method includes the following steps: receiving by a computer processor of a loyalty reward module an electronic record of a current order from a customer, the computer processor of the loyalty reward module having program instructions, which when executed by the processor of the loyalty reward module perform the steps of, obtaining by a computer processor of the loyalty reward module a loyalty reward budget for that customer from a reward database, obtaining by a computer processor of the loyalty reward module a plurality of customer loyalty reward levels, transmitting by a computer processor of the loyalty reward module the loyalty reward budget and the plurality of customer loyalty reward levels to an order fulfillment engine, determining by a computer processor of the order fulfillment engine a minimum possible fulfillment cost of the current order, determining by a computer processor of the fulfillment engine a maximum fulfillment cost by adding the transmitted loyalty reward budget of the current order to the minimum possible fulfillment cost of the current order, determining by a computer processor of the order fulfillment engine an order fulfillment cost of the current order from each of a plurality of order item assignments to a plurality of nodes, determining by a computer processor of the fulfillment engine whether each of the plurality of assignments satisfies a reward constraint based on a first customer loyalty reward level of the plurality of customer loyalty reward levels, identifying by a computer processor of the fulfillment engine one or more satisfactory assignments and nodes by identifying which of the one or more assignments is both associated with an order fulfillment cost that is less than the maximum fulfillment cost and satisfies the reward constraint and automatically generating by a computer processor of the fulfillment engine an item to node order assignment assigning the items of the current order to the one or more satisfactory nodes.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

The disclosure is directed to a computer system and computer-implemented method to generate sourcing selections for omni-channel fulfillment in retail supply networks that accounts for different customers having associated reward levels.

The computer system and computer-implemented method exemplifies an improvement to selecting eligible nodes and item assignments to those nodes for order fulfillment. As used herein the term node refers to a retailer's shipping and fulfillment centers as well as a retailer's commercial store that is capable of fulfilling orders placed by customers through the internet, as well as any other channel capable of producing or holding inventory and fulfilling an item of an order, such as a third-party logistics provider or drop ship vendor.

While eligible nodes and item assignments for order fulfillment have been typically selected based on inventory availability above certain thresholds, this typical method is unable to take into account rewarding a loyal customer through differentiated fulfillment while increasing the fulfillment cost by less than a specified amount. This reward amount can be used to benefit the loyal customer when the decision is made to fulfill the current order from eligible nodes, for example, by shipping the order in fewer number of packages or getting it to the customer sooner. What constitutes a reward or benefit to the customer can depend on a particular case, for example, the particular company and even the particular customer.

Implementing the system and computer-implemented methods described herein, eligible nodes and item assignments to those nodes for fulfillment may be selected based on both a reward budget associated with the customer placing the order, and a reward constraint, which are discussed herein.

Computing an order fulfillment assignment ensures that a customer placing an order can be assigned an appropriate budget for increasing the cost to fulfill the order, which can be maintained within ranges specified by the retailer.

Figure 1:
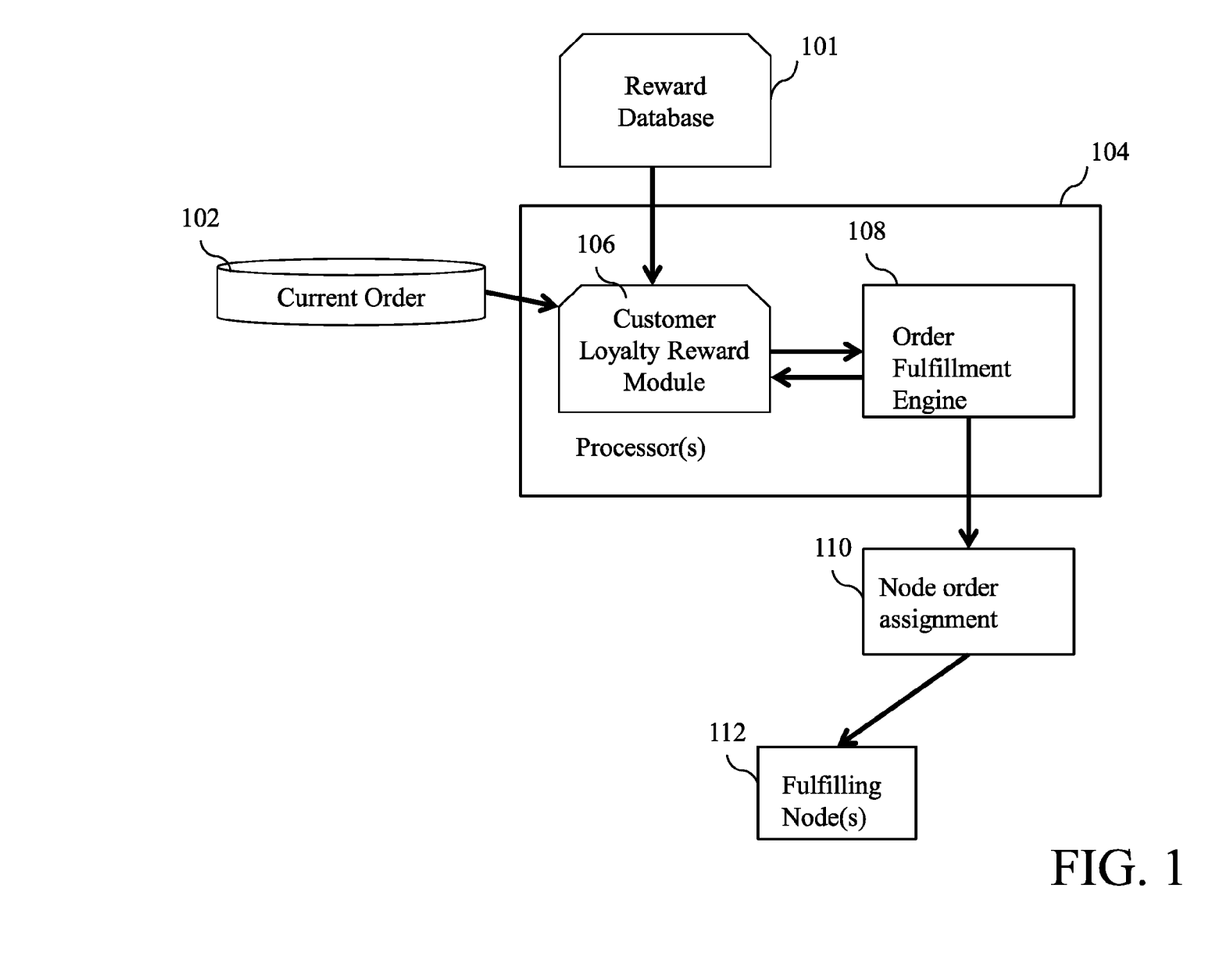
FIG. 1 is an overall system diagram of a system environment running methods described herein.
Figure 2:
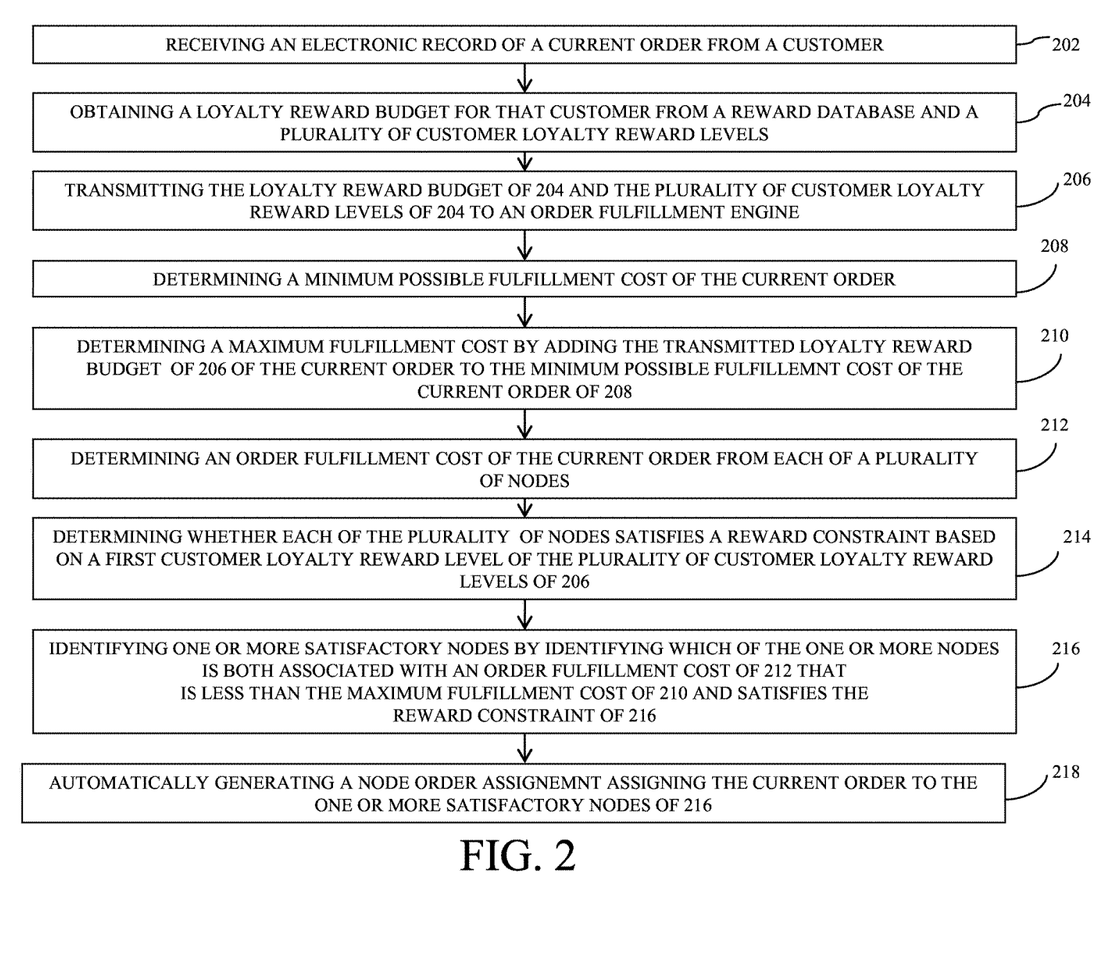
FIG. 2 is a flow diagram illustrating a method of order fulfillment in a multiple node marketplace in one embodiment of the present disclosure.

In a method for providing a customer differentiated order fulfillment assignment, one or more processors of a computer are implemented to automatically generate a node order assignment, assigning a current order to one or more satisfactory nodes. FIG. 1 depicts the computer system that provides a customer differentiated order fulfillment assignment. In particular, FIG. 1 illustrates the receipt of a current order 102 by one or more hardware processors 104. Included as part of the one or more hardware processors are the customer loyalty reward module 106 and the order fulfillment engine 108. A flow diagram of the method is shown in FIG. 2. Receipt of an electronic record of the current order from the customer is step 202 of FIG. 2.

As can be seen from FIG. 1, customer loyalty reward module 106 and the order fulfillment engine 108 are configured to communicate with each other. The use of the customer loyalty reward module 106 and the use of the order fulfillment engine 108 are discussed below. In the embodiments discussed below certain calculations and determinations are described as being made by one of the customer loyalty reward module 106 and the order fulfillment engine 108, but in other embodiments, these calculations and determinations can be made by the other of the customer loyalty reward module 106 and the order fulfillment engine 108.

After receipt of the current order 102 from the customer, the customer loyalty reward module 106 obtains, by a computer processor of the loyalty reward module, a loyalty reward budget for that customer from a reward database 101, in step 201 of FIG. 2. The loyalty reward budget is an increased amount of cost to fulfill the order that can be spent above a minimum fulfillment cost of the order and can be decided upon by the retailer.

This loyalty reward budget can be assigned to the specific customer of the current order or to all customers evenly or proportionally, and can also be limited per order based on a status level of the customer or order. The loyalty reward module 106 can assign the loyalty reward budget for the specific customer, with the loyalty reward budget being determined by historical data of previous orders made by the same customer or other customers, and can be determined by at least one of the status level of the customer, a purchase history of the customer, a clearance level of one or more items of the current order, and a brand of one or more items of the current order.

The customer status level can be, for example, a gold level, a silver level, etc., which is achieved by that customer due to previous actions by that customer. The purchase history of the customer can be used to determine the loyalty reward budget by, for example, providing for a higher loyalty reward budget if the customer has made many previous orders or made previous orders above a threshold value. The clearance level of one or more items of the current order can be used to determine the loyalty reward budget by, for example, providing for a lower loyalty reward budget if the item or items of the order were purchased on clearance. The brand of the item or items of the current order can be used to determine the loyalty reward budget by, for example, providing for a higher loyalty reward budget if the brand of the item or items is a brand predetermined by the retailer, for example the NIKE® brand of clothing and footwear.

The loyalty reward module 106 can assign the loyalty reward budget for all customers evenly by dividing a total reward budget by a number of overall orders and assigning the divided amount to the current order. The loyalty reward module 106 can alternatively assign the loyalty reward budget for all customers proportionally by sorting all customers into different buckets of reward budget by their status level and provide all customers in the same bucket the same loyalty reward budget.

The loyalty reward module 106 can also assign the loyalty reward budget with a limited per order based on the status level of the customer. This loyalty reward budget can be a set value for the status level of the customer, regardless of the contents or amount of the current order.

After the loyalty reward budget is obtained, a plurality of customer loyalty reward levels are obtained in step 204 of FIG. 2, by a computer processor of, the customer loyalty reward module 106. These loyalty reward levels are discussed in detail below.

The loyalty reward budget and the plurality of customer loyalty reward levels are then transmitted, by a computer processor of the customer loyalty reward module 106, to the order fulfillment engine 108, in step 206 of FIG. 2.

A computer processor of the order fulfillment engine 108 then determines the minimum possible fulfillment cost of the current order in step 208 of FIG. 2. This fulfillment cost can include the shipping cost, labor cost, overtime labor cost, etc. and is the minimum possible fulfillment cost of all of the plurality of assignments to the plurality of nodes. The minimum possible fulfillment cost is determined according to various scenarios. These varying scenarios can include: shipping a portion of items ordered from one node while shipping the other portion of items ordered from one or more other nodes; shipping all items of the current order in one package from one node and shipping in two or more packages all items in the current order from one node. Additionally the reward level of the minimum possible fulfillment cost assignment can be determined based on the variables of the solution determined by the assignment relating to the reward dimension used by the retailer, such as the number of packages, the number of days it is expected for the customer to receive the package, etc. Subsequently this can be used as the initial, starting reward level for that order.

A maximum fulfillment cost is determined by, a computer processor of, the order fulfillment engine 108, with the maximum fulfillment cost being determined by adding together the loyalty reward budget and the minimum possible fulfillment cost in step 210 of FIG. 2. This maximum fulfillment cost is created to be the greatest allowable increase in the cost to serve in fulfilling the current order to provide a differentiated customer order fulfillment experience.

Then, a computer processor of the order fulfillment engine 108 determines an order fulfillment cost of the current order from each of a plurality of assignments of the items of the order to a plurality of nodes in step 212 of FIG. 2. These nodes can include all of a retailer's shipping and fulfillment centers as well as the retailer's commercial stores that are capable of fulfilling the current order, and any other channel capable of fulfilling any item of the order for the retailer. Out of the plurality of nodes, the cost to fulfill the current order across varying scenarios from one or more of the plurality of nodes is determined. Varying scenarios can include: shipping a portion of items ordered from one node while shipping the other portion of items ordered from one or more other nodes; shipping all items of the current order in one package from one node and shipping in two or more packages all items in the current order from one node.

Also determined, by a computer processor of the order fulfillment engine 108, is whether each of the plurality of assignments to the plurality of nodes satisfies a reward constraint in step 214 of FIG. 2. This reward constraint is determined by a first customer loyalty reward level of the plurality of customer loyalty reward levels that are transmitted, by a computer processor of the customer loyalty reward module 106 to the order fulfillment engine 108. This first reward level can be such that it is an improved reward level over the initial reward level of the minimum fulfillment cost assignment solution.

The reward constraint is a model that can weigh variables and ensure that the order fulfillment is within certain specified guidelines.

As one example, the reward constraint can be a function of a shipping speed of the current order, a number of packages shipped to fulfill the current order, and a carbon dioxide output resulting from delivery of the current order. In this example, a reward constraint is shown in equation 1 below:

$$f(C_p P, C_d d, C_g g) < L \qquad \text{Eq. 1}$$

In this exemplary constraint, P is assigned to the number of packages to fulfill the current order, d is the number of days between the current order being placed and the current order being received by the customer, and g is an amount of carbon dioxide associated with fulfilling the current order. Further, $C_p$, $C_d$ and $C_g$ are adjustable tuning parameters that can be adjusted by a retailer to modify the weight of each variable. In this exemplary reward constraint L is the loyalty reward level with a smaller L corresponding to increased reward.

The loyalty reward level is a number that is assigned to the current order based on the specific customer or all customers generally. These loyalty reward levels are preset to serve as an overall constraint on the amount of the reward for an order assignment. Alternatively, the loyalty reward level is not set for the customer and a lowest level is assigned to that order. After this lowest level assignment, the level is iteratively increased by the order fulfillment engine 108, as discussed in detail below.

Each of the plurality of customer loyalty levels is different from one another and each of the plurality of customer loyalty levels is associated with at least one of increasing a shipping speed of the current order, decreasing a number of packages shipped to fulfill the current order and decreasing a carbon dioxide output resulting from delivery of the current order.

Based on the specific characteristics of each of the plurality of assignments to the plurality of nodes, the computer processor of the order fulfillment engine 108 determines which of the plurality of assignments can satisfy the reward constraint based on a value of the first customer loyalty reward level.

To determine one or more satisfactory nodes and ordered item assignments for fulfilling the current order, a computer processor of the order fulfillment engine 108 identifies one or more satisfactory nodes by identifying which of the one or more nodes and ordered item assignments to the nodes is associated with both an order fulfillment cost that is less than the maximum fulfillment cost and that satisfies the reward constraint in step 216 of FIG. 2. Of these one or more satisfactory nodes, a computer processor of the order fulfillment engine 108 automatically generates a node order assignment 110, which assigns the items of the current order to be fulfilled to one or more of the satisfactory nodes 112 in step 218 of FIG. 2 for fulfillment.

In some embodiments, the node or nodes and ordered item assignments with the least order fulfillment cost (that still satisfies the reward constraint) can be selected if an overall cost savings is desired. In other embodiments, the node or nodes and ordered item assignments providing the best reward level (that still satisfies the reward constraint) and having fulfillment cost that is still at or below the maximum fulfillment cost can be selected if a higher level of customer service is desired. In this embodiment, for example, a faster shipping speed may increase the fulfillment cost but that cost still remains below the maximum fulfillment cost.

After the node assignment, the computer processor of the order fulfillment engine 108 can determine an unspent budget amount by subtracting the order fulfillment cost of the one or more satisfactory assignments of items to nodes from the maximum fulfillment cost and transmitting that unspent budget amount to the customer loyalty reward module 106. This unspent budget amount can be saved and applied to a future order of the same customer, or the unspent budget amount can be applied to a different customer as part of a future order.

In the above described embodiment, the computer process or the order fulfillment engine 108 determined whether each of the plurality of assignments to the plurality of nodes satisfied the reward constraint based on a first customer loyalty reward level. In another embodiment, this customer loyalty reward level can be increased or decreased.

The customer loyalty reward level can be increased if a higher level of customer service is desired or available. The customer loyalty reward level can also be decreased if none of the plurality of assignments to the plurality of nodes satisfy the reward constraint. For example, it can be determined whether each of the plurality of assignments satisfies the reward constraint based on a second customer loyalty reward level, or a third customer reward level, etc., which is either higher or lower than the first customer loyalty reward level.

Figure 3:
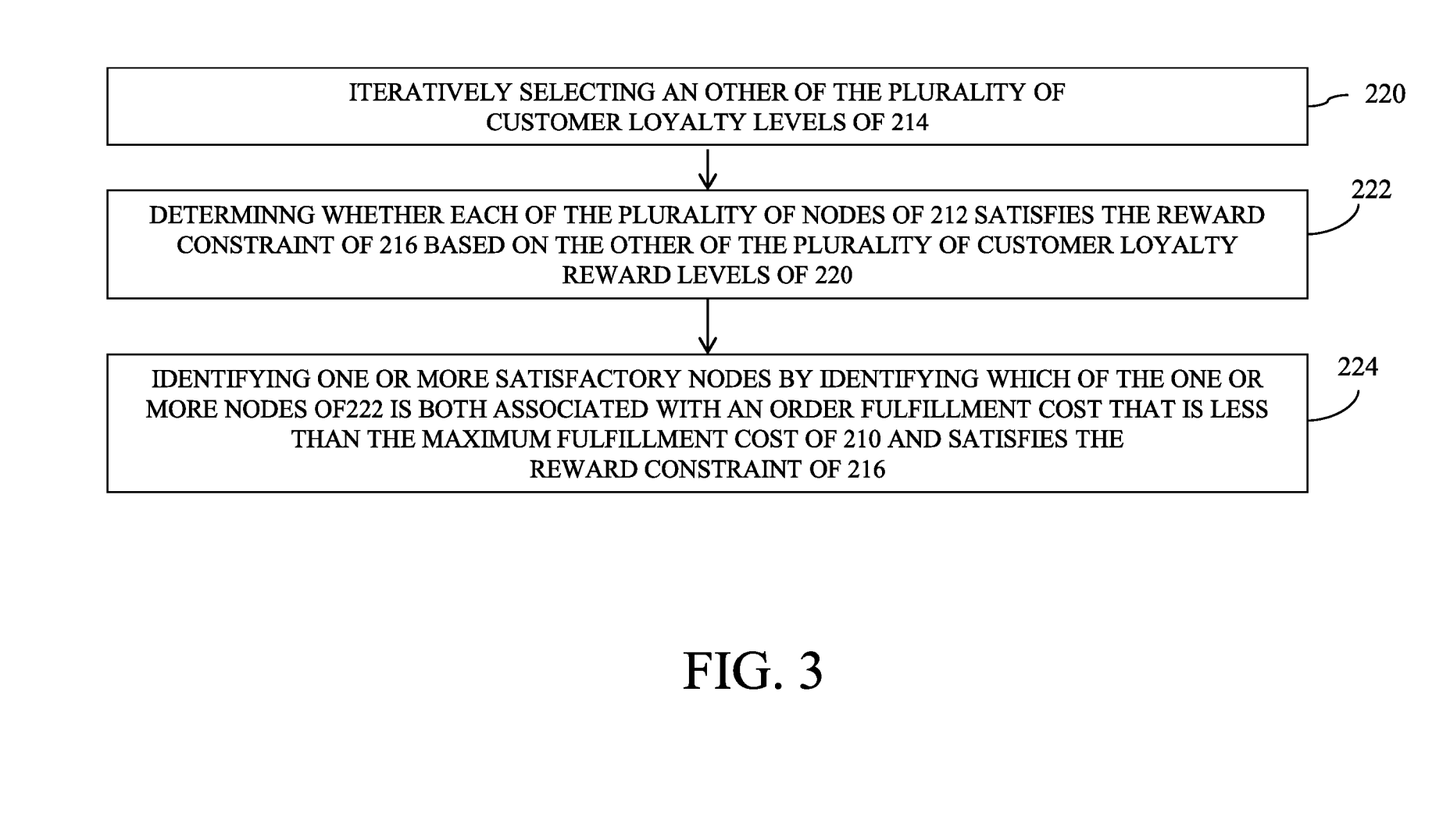
FIG. 3 is a flow diagram illustrating a method of order fulfillment in a multiple node marketplace in another embodiment of the present disclosure.

In one embodiment, the computer processor of the order fulfillment engine 108 can iteratively select a different customer loyalty level, either a higher level or a lower level, in step 220 of FIG. 3. With this second customer loyalty level the computer processor of the order fulfillment engine 108 determines whether each of the plurality of assignments satisfies the reward constraint based on this second customer loyalty reward level in step 222 of FIG. 3.

The computer processor of the order fulfillment engine 108 then determines one or more satisfactory ordered item assignments to nodes by identifying which of the one or more assignments is both associated with an order fulfillment cost that is less than the maximum fulfillment cost and satisfies the reward constraint based on the second customer loyalty reward level in step 224 of FIG. 3.

After the one or more ordered item assignments to nodes are identified, the computer processor of the order fulfillment engine 108 then automatically generates a node order assignment that assigns the current order to the one or more satisfactory nodes that satisfy the reward constraint based on the second customer loyalty reward level in step 218 of FIG. 2.

In this embodiment the computer processor of the order fulfillment engine 108 can continue changing the customer loyalty reward level, either to a higher or lower value as compared to the previous reward level. This change can be made limited to a number of changes, or changes can occur until an optimal node order assignment is determined While the above description referred to a retailer, it should be understood that the methodology may apply to any seller of one or more products. In the claims, the terms "first" and "second" with respect to a seller are used only to differentiate one seller from another seller. Those terms do not denote any order or impart any other meaning.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 4:
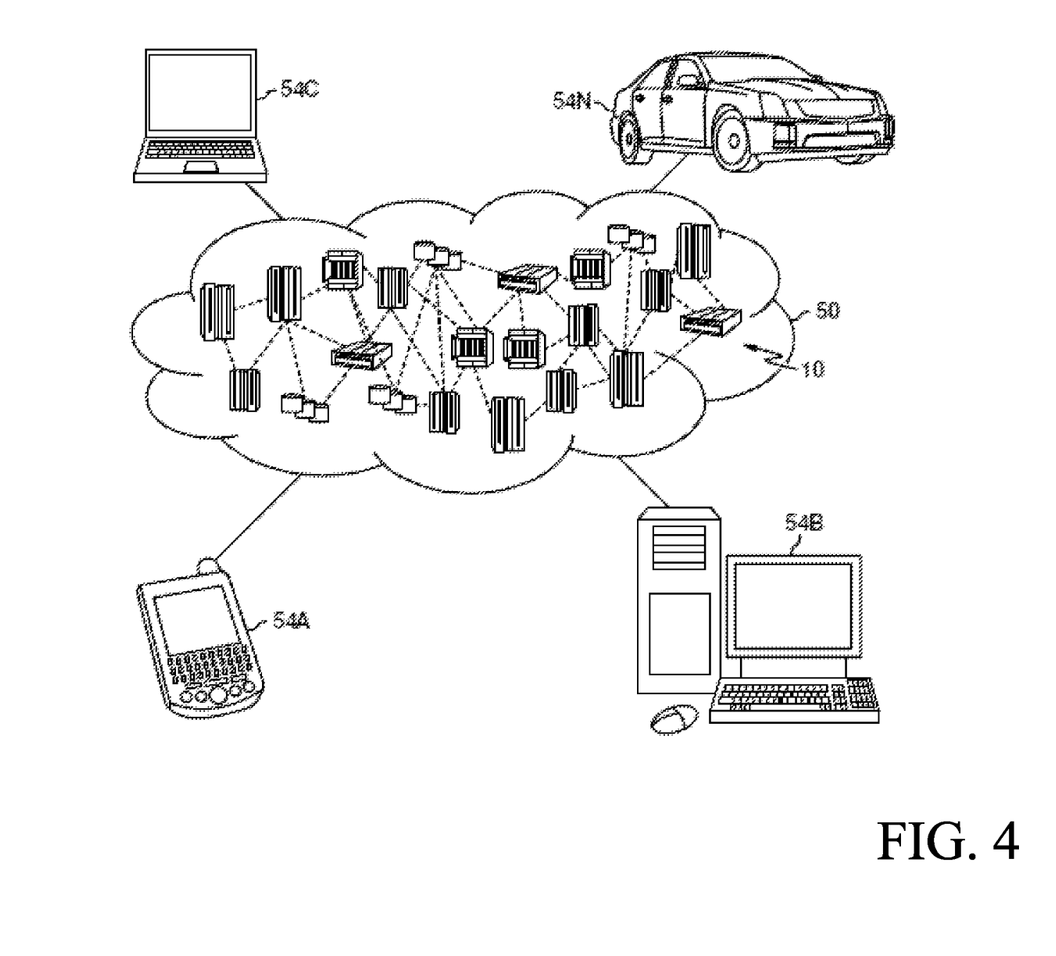
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
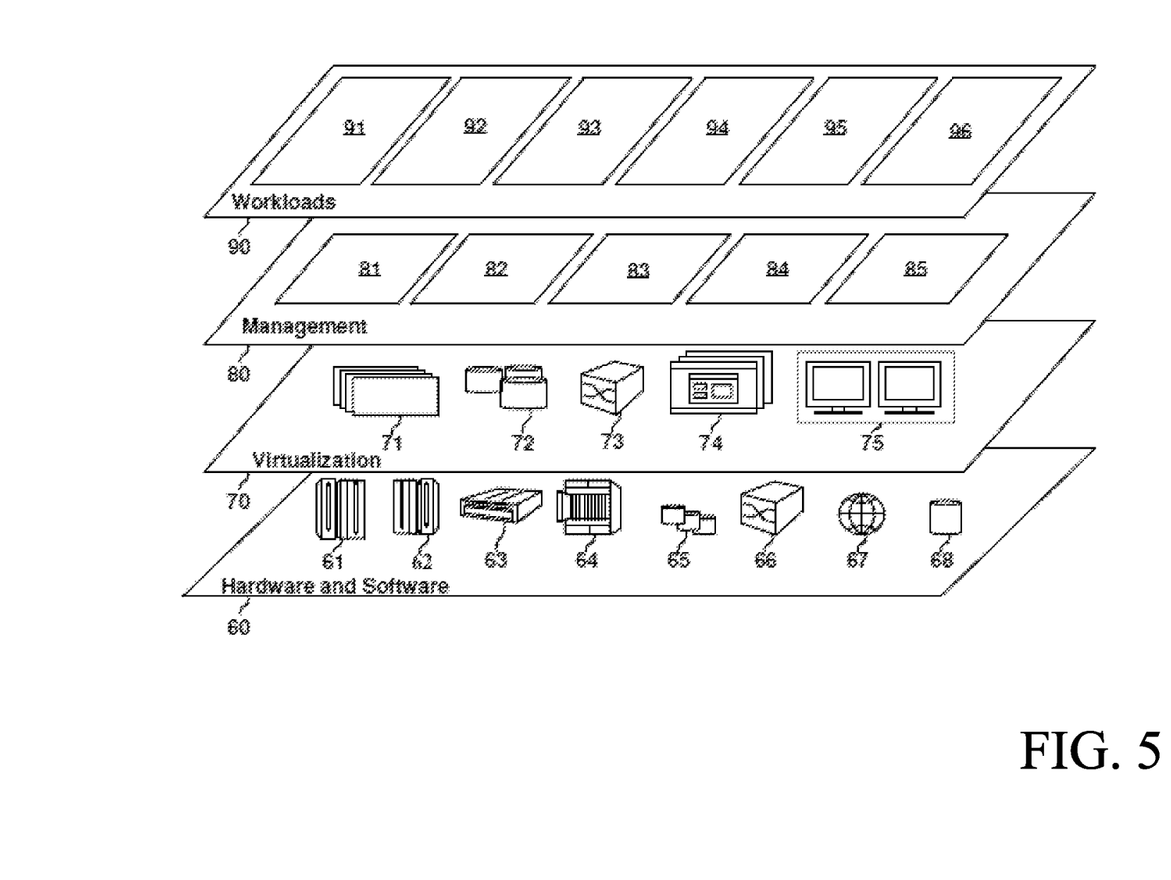
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and order fulfillment optimization 96.

Figure 6:
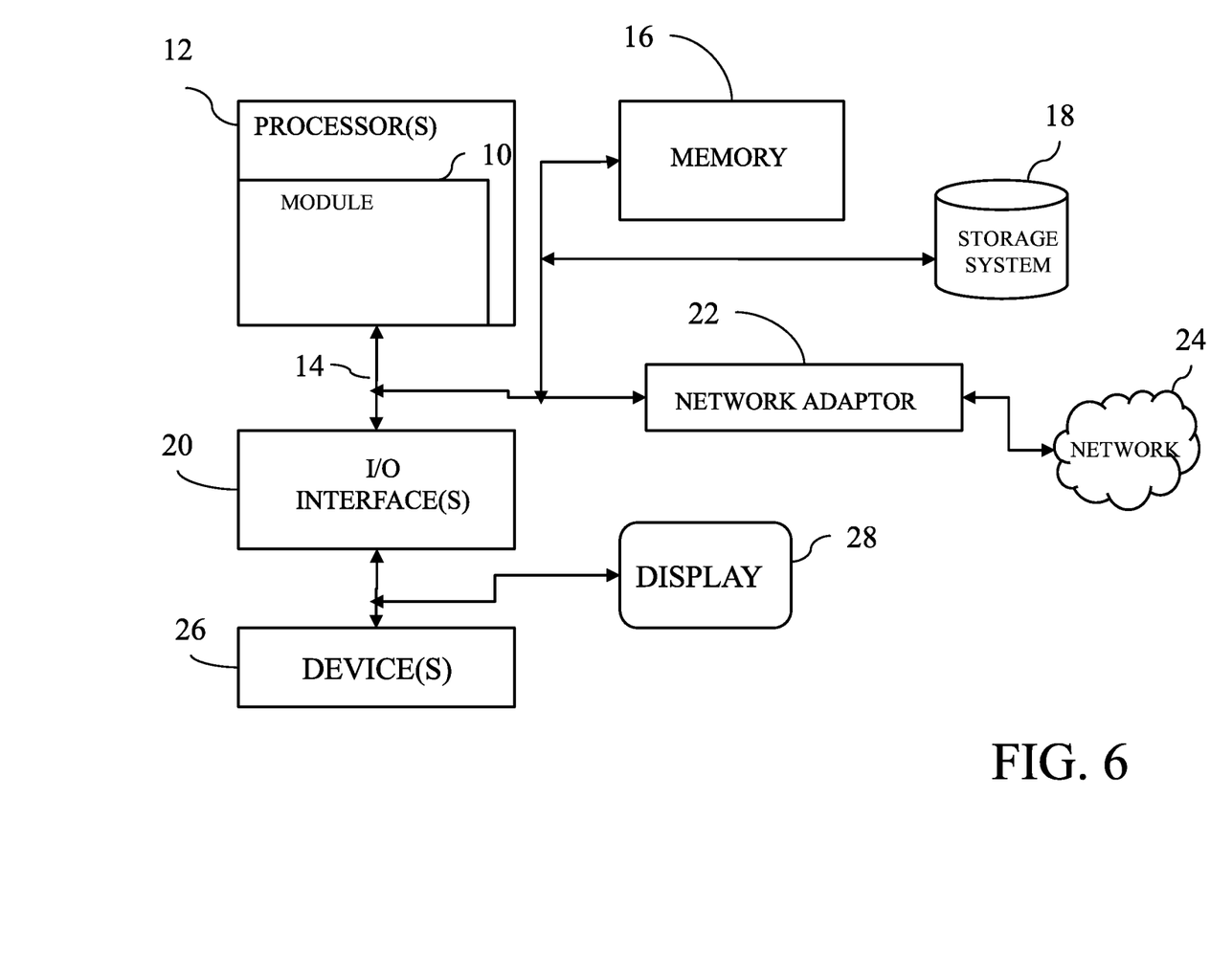
FIG. 6 illustrates a schematic of an example computer or processing system that may implement a price matching system in one embodiment of the present disclosure.

FIG. 6 illustrates a schematic of an example computer or processing system that may implement customer differentiated order fulfillment assignment in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 11 that performs the methods described herein. The module 11 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a special purpose computer or machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for providing a customer differentiated order fulfillment assignment, comprising:
   receiving by a computer processor of a loyalty reward module an electronic record of a current order from a customer, the computer processor of the loyalty reward module having program instructions, which when executed by the processor of the loyalty reward module perform the steps of:
   obtaining by a computer processor of the loyalty reward module a loyalty reward budget for that customer from a reward database;
   obtaining by a computer processor of the loyalty reward module a plurality of customer loyalty reward levels;
   transmitting by a computer processor of the loyalty reward module the loyalty reward budget and the plurality of customer loyalty reward levels to an order fulfillment engine;
   determining by a computer processor of the order fulfillment engine a minimum possible fulfillment cost of the current order;
   determining by a computer processor of the fulfillment engine a maximum fulfillment cost by adding the transmitted loyalty reward budget of the current order to the minimum possible fulfillment cost of the current order;
   determining by a computer processor of the order fulfillment engine an order fulfillment cost of the current order from each of a plurality of assignments to a plurality of nodes;
   determining by a computer processor of the fulfillment engine whether each of the plurality of assignments satisfies a reward constraint based on a first customer loyalty reward level of the plurality of customer loyalty reward levels;
   identifying by a computer processor of the fulfillment engine one or more satisfactory assignments to nodes by identifying which of the one or more assignments is both associated with an order fulfillment cost that is less than the maximum fulfillment cost and satisfies the reward constraint; and
   automatically generating by a computer processor of the fulfillment engine a node order assignment assigning the current order to the one or more satisfactory nodes.

2. The computer implemented method of claim 1, wherein each of the plurality of customer loyalty levels is different from one another and each of the plurality of customer loyalty levels is associated with at least one of increasing a shipping speed of the current order, decreasing a number of packages shipped to fulfill the current order and decreasing a carbon dioxide output resulting from delivery of the current order.

3. The computer implemented method of claim 2, further comprising steps just prior to the automatically generating step, the steps comprising: iteratively selecting an other of the plurality of customer loyalty levels;
   determining by a computer processor of the fulfillment engine whether each of the plurality of assignments to the plurality of nodes satisfies the reward constraint based on the other of the plurality of customer loyalty reward levels;
   identifying by a computer processor of the fulfillment engine one or more satisfactory assignments to nodes by identifying which of the one or more assignments is both associated with an order fulfillment cost that is less than the maximum fulfillment cost and satisfies the reward constraint.

4. The computer implemented method of claim 1, wherein the reward constraint is a function of a shipping speed of the current order, a number of packages shipped to fulfill the current order, and a carbon dioxide output resulting from delivery of the current order.

5. The computer implemented method of claim 1, wherein the fulfillment engine determines an unspent budget by subtracting the order fulfillment cost of the one or more satisfactory assignments to the one or more nodes from the maximum fulfillment cost and transmits the unspent budget to the loyalty reward module.

6. The computer implemented method of claim 1, wherein the loyalty reward budget is determined by historical data of previous orders.

7. The computer implemented method of claim 6, wherein the loyalty reward budget for the customer is determined by at least one of a status level of the customer, a purchase history of the customer, a clearance level of one or more items of the current order, a brand of one or more items of the current order.

8. The computer implemented method of claim 1, wherein a computer processor of the loyalty reward module assigns a customer status level to the current order.

9. A system for providing a customer differentiated order fulfillment assignments, comprising:
   one or more storage devices;
   one or more hardware processors coupled to the one or more storage devices;
   one or more hardware processors operable to receive by a loyalty reward module an electronic record of a current order from a customer, the processor of the loyalty reward module having program instructions;
   one or more hardware processors operable for obtaining by the loyalty reward module, a loyalty reward budget for that customer from a reward database;
   one or more hardware processors operable for obtaining by the loyalty reward module a plurality of customer loyalty reward levels;
   one or more hardware processors operable for transmitting by the loyalty reward module the loyalty reward budget and the plurality of customer loyalty reward levels to an order fulfillment engine;

one or more hardware processors operable for determining by the order fulfillment engine a minimum possible fulfillment cost of the current order;

one or more hardware processors operable for determining by the order fulfillment engine a maximum fulfillment cost by adding the transmitted loyalty reward budget of the current order to the minimum possible fulfillment cost of the current order;

one or more hardware processors operable for determining by the order fulfillment engine an order fulfillment cost of the current order from each of a plurality of assignments to a plurality of nodes;

one or more hardware processors operable for determining by the order fulfillment engine whether each of the plurality of assignments satisfies a reward constraint based on a first customer loyalty reward level of the plurality of customer loyalty reward levels;

one or more hardware processors operable for identifying by the order fulfillment engine one or more satisfactory assignments to nodes by identifying which of the one or more assignments is both associated with an order fulfillment cost that is less than the maximum fulfillment cost and satisfies the reward constraint; and one or more hardware processors operable for automatically generating by the fulfillment engine a node order assignment assigning the current order to the one or more satisfactory nodes.

10. The system of claim 9, wherein each of the plurality of customer loyalty levels is different from one another and each of the plurality of customer loyalty levels is associated with at least one of increasing a shipping speed of the current order, decreasing a number of packages shipped to fulfill the current order and decreasing a carbon dioxide output resulting from delivery of the current order.

11. The system of claim 10, further comprising one or more hardware processors operable for iteratively selecting an other of the plurality of customer loyalty levels;

one or more hardware processors operable for determining by the fulfillment engine whether each of the plurality of assignments to the plurality of nodes satisfies a reward constraint based on the other of the plurality of customer loyalty reward levels;

one or more hardware processors identifying by the fulfillment engine one or more satisfactory assignment to nodes by identifying which of the one or more assignments is both associated with an order fulfillment cost that is less than the maximum fulfillment cost and satisfies the reward constraint.

12. The system of claim 9, wherein the reward constraint is a function of a shipping speed of the current order, a number of packages shipped to fulfill the current order, and a carbon dioxide output resulting from delivery of the current order.

13. The system of claim 9, wherein the one or more hardware processors are operable for determining by the fulfillment engine an unspent budget by subtracting the order fulfillment cost of the one or more satisfactory assignments to one or more nodes from the maximum fulfillment cost and transmits the unspent budget to the loyalty reward module.

14. The system of claim 9, wherein the loyalty reward budget is determined by historical data of previous orders.

15. The system of claim 14, wherein the loyalty reward budget for the customer is determined by at least one of a status level of the customer, a purchase history of the customer, a clearance level of one or more items of the current order, a brand of one or more items of the current order.

16. A computer readable storage medium storing a program of instructions executable by a machine to perform a method of providing a customer differentiated order fulfillment assignment, the method comprising:

receiving by a computer processor of a loyalty reward module an electronic record of a current order from a customer, the computer processor of the loyalty reward module having program instructions, which when executed by the processor of the loyalty reward module perform the steps of:

obtaining by a computer processor of the loyalty reward module a loyalty reward budget for that customer from a reward database;

obtaining by a computer processor of the loyalty reward module a plurality of customer loyalty reward levels;

transmitting by a computer processor of the loyalty reward module the loyalty reward budget and the plurality of customer loyalty reward levels to an order fulfillment engine;

determining by a computer processor of the order fulfillment engine a minimum possible fulfillment cost of the current order;

determining by a computer processor of the fulfillment engine a maximum fulfillment cost by adding the transmitted loyalty reward budget of the current order to the minimum possible fulfillment cost of the current order;

determining by a computer processor of the order fulfillment engine an order fulfillment cost of the current order from each of a plurality of assignments to a plurality of nodes;

determining by a computer processor of the fulfillment engine whether each of the plurality of assignments satisfies a reward constraint based on a first customer loyalty reward level of the plurality of customer loyalty reward levels;

identifying by a computer processor of the fulfillment engine one or more satisfactory assignments to nodes by identifying which of the one or more assignments is both associated with an order fulfillment cost that is less than the maximum fulfillment cost and satisfies the reward constraint; and automatically generating by a computer processor of the fulfillment engine a node order assignment assigning the current order to the one or more satisfactory nodes.

17. The computer readable storage medium of claim 16, wherein each of the plurality of customer loyalty levels is different from one another and each of the plurality of customer loyalty levels is associated with at least one of increasing a shipping speed of the current order, decreasing a number of packages shipped to fulfill the current order and decreasing a carbon dioxide output resulting from delivery of the current order.

18. The computer readable storage medium of claim 17, further comprising steps just prior to the automatically generating step, the steps comprising: iteratively selecting an other of the plurality of customer loyalty levels;

determining by a computer processor of the fulfillment engine whether each of the plurality of assignments to the plurality of nodes satisfies a reward constraint based on the other of the plurality of customer loyalty reward levels;

identifying by a computer processor of the fulfillment engine one or more satisfactory assignments to nodes by identifying which of the one or more assignments is both associated with an order fulfillment cost that is less than the maximum fulfillment cost and satisfies the reward constraint.

19. The computer readable storage medium of claim 16, wherein the reward constraint is a function of a shipping speed of the current order, a number of packages shipped to fulfill the current order, and a carbon dioxide output resulting from delivery of the current order.

20. The computer readable storage medium of claim 16, wherein the fulfillment engine determines an unspent budget by subtracting the order fulfillment cost of the one or more satisfactory assignments to one or more nodes from the maximum fulfillment cost and transmits the unspent budget to the loyalty reward module.

* * * * *